United States Patent
Darrow et al.

(10) Patent No.: US 10,955,807 B2
(45) Date of Patent: *Mar. 23, 2021

(54) CONTROLLING PLASMA ARC PROCESSING SYSTEMS AND RELATED SYSTEMS AND DEVICES

(71) Applicant: Hypertherm, Inc., Hanover, NH (US)

(72) Inventors: Clifford G. Darrow, Lyme, NH (US); Brett A. Hansen, Mapleton, UT (US); Martin Higgens, Lebanon, NH (US); Brenda Mahoney, Manchester, NH (US)

(73) Assignee: Hypertherm, Inc., Hanover, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/696,576

(22) Filed: Nov. 26, 2019

(65) Prior Publication Data
US 2020/0096961 A1   Mar. 26, 2020

Related U.S. Application Data

(63) Continuation of application No. 15/589,447, filed on May 8, 2017, now Pat. No. 10,539,942.
(Continued)

(51) Int. Cl.
*G05B 19/048* (2006.01)
*B23K 37/02* (2006.01)
(Continued)

(52) U.S. Cl.
CPC ............. *G05B 19/048* (2013.01); *B23K 7/10* (2013.01); *B23K 9/327* (2013.01); *B23K 10/02* (2013.01);
(Continued)

(58) Field of Classification Search
CPC .......... B23K 10/02; B23K 37/02; B23K 7/10; B23K 9/327; G05B 19/048; G05B 19/29;
(Continued)

(56) References Cited

U.S. PATENT DOCUMENTS 3,935,420 A ‡  1/1976  Sandstrom ............. B23K 9/025
                                                      219/124.31
4,168,430 A ‡  9/1979  Denis .................... B23K 11/252
                                                      219/110
(Continued)

FOREIGN PATENT DOCUMENTS

CN         202240118           5/2012
CN         202240118  U  ‡    5/2012
(Continued)

OTHER PUBLICATIONS

Data sheet for Segway RMP 440 LE, purportedly published online on Sep. 29, 2015. Printed from http://www.segway.com/media/1220/rmp440le.pdf.‡

Primary Examiner — William M McCalister
(74) Attorney, Agent, or Firm — Proskauer Rose LLP

(57) ABSTRACT

In some aspects, autonomous motion devices configured to operably connect to a plasma torch of a plasma cutting system can include: a body to support a power supply of the plasma cutting system and move relative to a workpiece; a torch holder connected to the body and configured to position a plasma arc torch tip of the plasma torch relative to a region of the workpiece to be processed; a drive system to translate the body supporting the power supply and torch autonomously relative to a surface of the workpiece during a plasma processing operation; and a processor in communication with the drive system and configured to communicate with the power supply, the processor being configured
(Continued)

to control the translation of the body relative to the workpiece in accordance with the plasma processing operation.

22 Claims, 3 Drawing Sheets

Related U.S. Application Data

(60) Provisional application No. 62/332,624, filed on May 6, 2016.

(51) Int. Cl.
*B23K 7/10* (2006.01)
*B23K 9/32* (2006.01)
*B23K 10/02* (2006.01)
*G05B 19/29* (2006.01)
*G05D 1/00* (2006.01)
*H05H 1/32* (2006.01)

(52) U.S. Cl.
CPC .............. *B23K 37/02* (2013.01); *G05B 19/29* (2013.01); *G05D 1/0088* (2013.01); *G05D 1/0094* (2013.01); *G05B 2219/45044* (2013.01); *G05B 2219/45163* (2013.01); *H05H 1/32* (2013.01)

(58) Field of Classification Search
CPC ....... G05B 2219/45163; G05D 1/0088; G05D 1/0094; B66F 5/04
See application file for complete search history.

(56) References Cited

U.S. PATENT DOCUMENTS

| | | | | | |
|---|---|---|---|---|---|
| 4,412,401 | A | ‡ | 11/1983 | Fundell | B23D 45/044 266/57 |
| 4,744,855 | A | ‡ | 5/1988 | Ellenberger | B29C 65/20 156/499 |
| 4,831,232 | A | ‡ | 5/1989 | Andersson | G05B 19/427 219/124.34 |
| 4,888,708 | A | ‡ | 12/1989 | Brantmark | G05B 19/427 700/264 |
| 5,773,786 | A | ‡ | 6/1998 | Sanders | B23K 10/02 219/121.45 |
| 5,990,446 | A | ‡ | 11/1999 | Zhang | B23K 10/02 219/121.45 |
| 2003/0173130 | A1 | ‡ | 9/2003 | Johns | B25J 5/007 180/234 |
| 2008/0087484 | A1 | ‡ | 4/2008 | Fenelli | B60B 19/003 180/236 |
| 2008/0203075 | A1 | ‡ | 8/2008 | Feldhausen | B23K 9/013 219/136 |
| 2009/0020970 | A1 | ‡ | 1/2009 | Klein | B23K 37/0282 280/47.35 |
| 2009/0161212 | A1 | ‡ | 6/2009 | Gough | B23K 9/167 359/462 |
| 2009/0314756 | A1 | ‡ | 12/2009 | Schaeffer | B23K 9/186 219/137 R |
| 2010/0051596 | A1 | ‡ | 3/2010 | Diedrick | B23K 9/1336 219/137.2 |
| 2010/0133241 | A1 | ‡ | 6/2010 | Wilhelm | B23K 9/0953 219/121.46 |
| 2010/0176106 | A1 | ‡ | 7/2010 | Christensen | B23K 37/0252 219/137 R |
| 2010/0314373 | A1 | ‡ | 12/2010 | Patterson | B23K 9/1336 219/136 |
| 2011/0095009 | A1 | ‡ | 4/2011 | Kindig | B23K 9/10 219/130.1 |
| 2011/0198317 | A1 | ‡ | 8/2011 | Lin | B23K 9/16 219/73 |
| 2011/0210110 | A1 | ‡ | 9/2011 | Dearman | B23K 9/0206 219/137 R |
| 2012/0080417 | A1 | ‡ | 4/2012 | Oberzaucher | B23K 9/32 219/136 |
| 2012/0261459 | A1 | ‡ | 10/2012 | Bruck | B23K 35/327 228/178 |
| 2013/0119033 | A1 | ‡ | 5/2013 | Lipnevicius | B23K 37/02 219/130.1 |
| 2014/0110381 | A1 | ‡ | 4/2014 | Mather | B23K 7/10 148/196 |
| 2014/0291297 | A1 | ‡ | 10/2014 | Chen | B23K 9/09 219/74 |
| 2015/0158129 | A1 | ‡ | 6/2015 | Matthews | B60B 19/003 219/13 |

FOREIGN PATENT DOCUMENTS

| | | | |
|---|---|---|---|
| EP | 1342527 | | 9/2003 |
| EP | 1342527 A1 | ‡ | 9/2003 ............ B23K 26/60 |
| JP | H07284948 | | 10/1995 |
| JP | H07284948 A | ‡ | 10/1995 |
| JP | 2001276973 | | 10/2001 |
| JP | 2001276973 A | ‡ | 10/2001 |

‡ imported from a related application

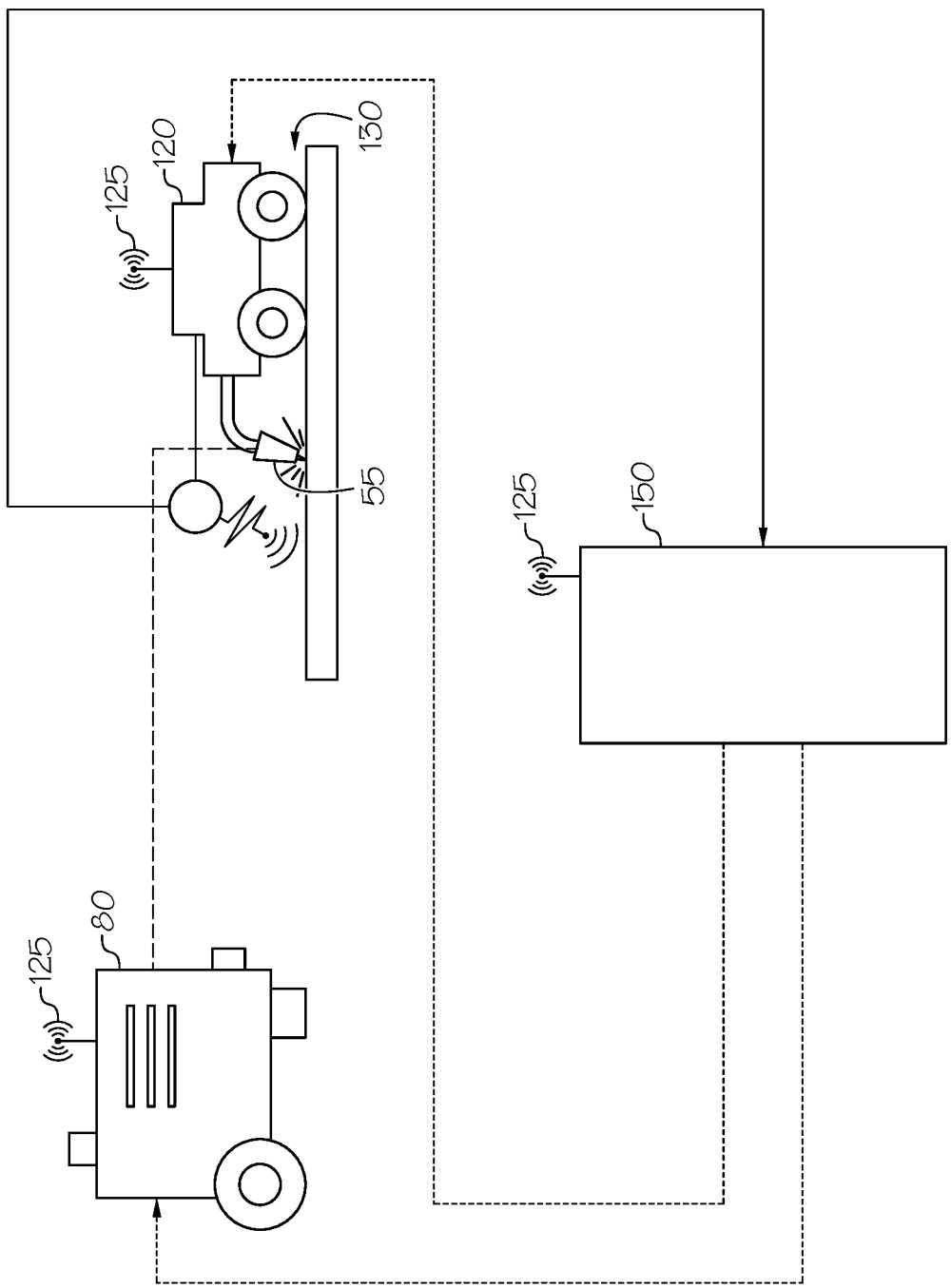

CONTROLLING PLASMA ARC PROCESSING SYSTEMS AND RELATED SYSTEMS AND DEVICES

RELATED APPLICATIONS

This application is a continuation of U.S. patent application Ser. No. 15/589,447, filed May 8, 2017, which claims the benefit of U.S. Provisional Patent Application Ser. No. 62/332,624 filed May 6, 2016, entitled "Remote Control Plasma Cutting/Gouging System." These applications are owned by the assignee of the instant application and are hereby incorporated herein by reference in their entirety.

TECHNICAL FIELD

This disclosure relates generally to plasma arc processing systems, and more specifically to controlling plasma arc processing systems and to related systems and methods.

BACKGROUND

Plasma arc cutting torches are widely used in the cutting, gouging and marking of materials. A plasma arc torch generally includes an electrode, a nozzle having a central exit orifice mounted within a torch body, electrical connections, passages for cooling, and passages for arc control fluids (e.g., plasma gas). Optionally, a swirl ring is employed to control fluid flow patterns in the plasma chamber formed between the electrode and the nozzle. In some torches, a retaining cap can be used to maintain the nozzle and/or swirl ring in the plasma arc torch. In operation, a plasma arc torch produces a plasma arc, which is a constricted jet of mostly ionized gas with high temperature and that can have sufficient momentum to assist with removal of molten metal. A plasma cutting system can include at least one plasma arc torch, a power source for supplying power to the plasma arc torch, and a gas source for supplying a gas (e.g., air) to the plasma arc torch to support various torch operations.

Typically, plasma arc torches are coupled to large and/or heavy (e.g., stationary) power supplies by lead lines that provide the electricity and pressurized gases needed to form a plasma jet. The lead lines typically are made to have a defined length which can limit the ability to perform a plasma processing operation beyond a certain length from the stationary power supply.

SUMMARY

In some aspects, autonomous motion devices configured to operably connect to a plasma torch of a plasma arc processing system can include: a body to support a power supply of the plasma cutting system and move relative to a workpiece; a torch holder connected to the body and configured to position a plasma arc torch tip of the plasma torch relative to a region of the workpiece to be processed; a drive system to translate the body supporting the power supply and torch autonomously relative to a surface of the workpiece during a plasma processing operation; and a processor in communication with the drive system and configured to communicate with the power supply, the processor being configured to control the translation of the body relative to the workpiece in accordance with the plasma processing operation.

Embodiments can include one or more of the following features.

The motion devices can include a set of sensors configured to monitor at least one characteristic of the plasma processing operation or the translation of the body relative to the workpiece. The set of sensors can include a light sensor configured to monitor cut quality. A processor can be configured to communicate feedback from the set of sensors to the plasma cutting system. The set of sensors can obtain information to determine a travel path of the autonomous motion device. The motion devices can include one or more Internet-of-things (IOT) devices configured to collect operational data for transmission to mobile devices.

The torch holder can be configured to manipulate the plasma arc torch tip along at least one of an x, y, or z axes relative to the body. The manipulation of the plasma arc torch tip can include at least one of positioning or actuating the torch tip.

The processor can be configured to be separated and reconnected to the power supply for operation of the plasma arc processing system and the autonomous motion device.

The motion devices can include a gas supply configured to travel with the body.

The motion devices can include a control device in communication with the processor. The drive system can include an omnidirectional robotic drive system.

The motion devices can include a means to monitor a travel path of the motion device during the plasma processing operation. The means to monitor a travel path of the motion device can include a means to provide travel path information to the processor to carry out a feedback loop to control the translation of the body relative to the workpiece in accordance with the plasma processing operation. The means can include a probe to physically detect a planned plasma processing path.

In some aspects, autonomous plasma arc processing systems can include: a plasma torch power supply configured to generate a plasma arc; a plasma arc torch operably connected to the power supply; an autonomous pressurized gas source fluidly connected to the plasma arc torch; and an autonomous motion device operably connected to the plasma arc torch and supporting the power supply, the motion device having: a body to support the power supply and move relative to a workpiece; a torch holder connected to the body and configured to position a plasma arc torch tip of the plasma arc torch relative to a region of the workpiece to be processed; a drive system to translate the body supporting the power supply and torch autonomously relative to a surface of the workpiece during a plasma processing operation; and a processor in communication with the drive system and configured to communicate with the power supply, the processor being configured to control the translation of the body relative to the workpiece in accordance with the plasma processing operation.

In some aspects, methods of operating a plasma arc processing system with an autonomous motion device configured to move the plasma arc processing system relative to a workpiece can include: initiating a plasma arc from a torch tip of a plasma torch of the plasma arc processing system operably connected to the motion device, the plasma arc beginning a plasma processing operation on the workpiece; autonomously moving the motion device, the motion device supporting the plasma arc processing system, relative to the workpiece to perform the plasma processing operation along an intended processing path of the workpiece; and extinguishing the plasma arc.

Embodiments can include one or more of the following features.

The methods can also include monitoring the plasma processing operation using one or more sensors disposed on the autonomous motion device. The methods can also include manipulating the torch tip relative to the workpiece during the movement relative to the workpiece. The methods can also include determining a planned travel path along the workpiece to perform the plasma processing operation.

Embodiments described herein can have one or more of the following advantages.

In some aspects, the systems and methods described herein can provide for system level integration of components and functions that are conventionally configured separately, which can provide an all-in-one solution that delivers a simple, mobile, easy to manage solution for the customer.

Additionally, in some aspects, the autonomous systems and methods described herein can provide for improved performance for remote automated gouging and cutting. For example, the autonomous systems and methods described herein can be used to access hard-to-reach areas or regions to be cut or gouged. Additionally or alternatively, the systems and methods described herein can be used to perform longer continuous cuts or gouges than can be performed by conventional plasma arc systems. Specifically, most plasma processing operations are constrained by a length of the torch lead line such that a cut is stopped when the plasma torch reaches the end of the lead line. Thus, the cut needs to be stopped, the power supply or workpiece needs to be moved relative to one another, all before a new cut can be performed. Whereas, with the power supply being carried relative to a workpiece on the motion device described here, the cut is not constrained by a torch lead line length and a cut can be performed continuously along long lengths.

BRIEF DESCRIPTION OF THE DRAWINGS

FIG. 3 is a schematic view of an example autonomous motion device control network.

DETAILED DESCRIPTION

In some aspects, the systems and methods described herein can be used to create plasma arc processing systems that are more accessible and autonomous than some conventional systems by locating (e.g., positioning, packaging) system components, such as the power supply and torch on a motion device (e.g., an autonomous robotic system) configured to carry the power supply and torch together relative to a workpiece during a processing operation.

Figure 1:
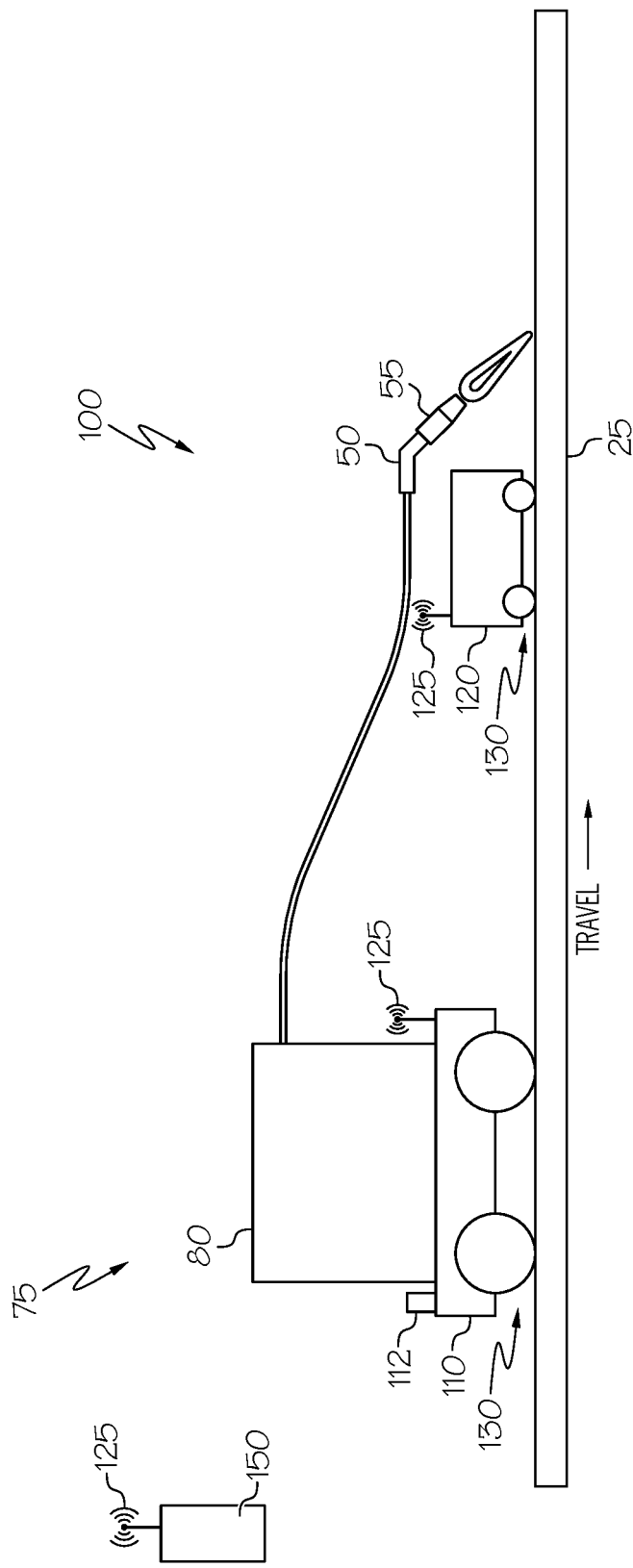
FIG. 1 is a side schematic side view of an example autonomous motion device configured to support and carry a plasma arc processing system and a plasma arc torch.
Figure 2:
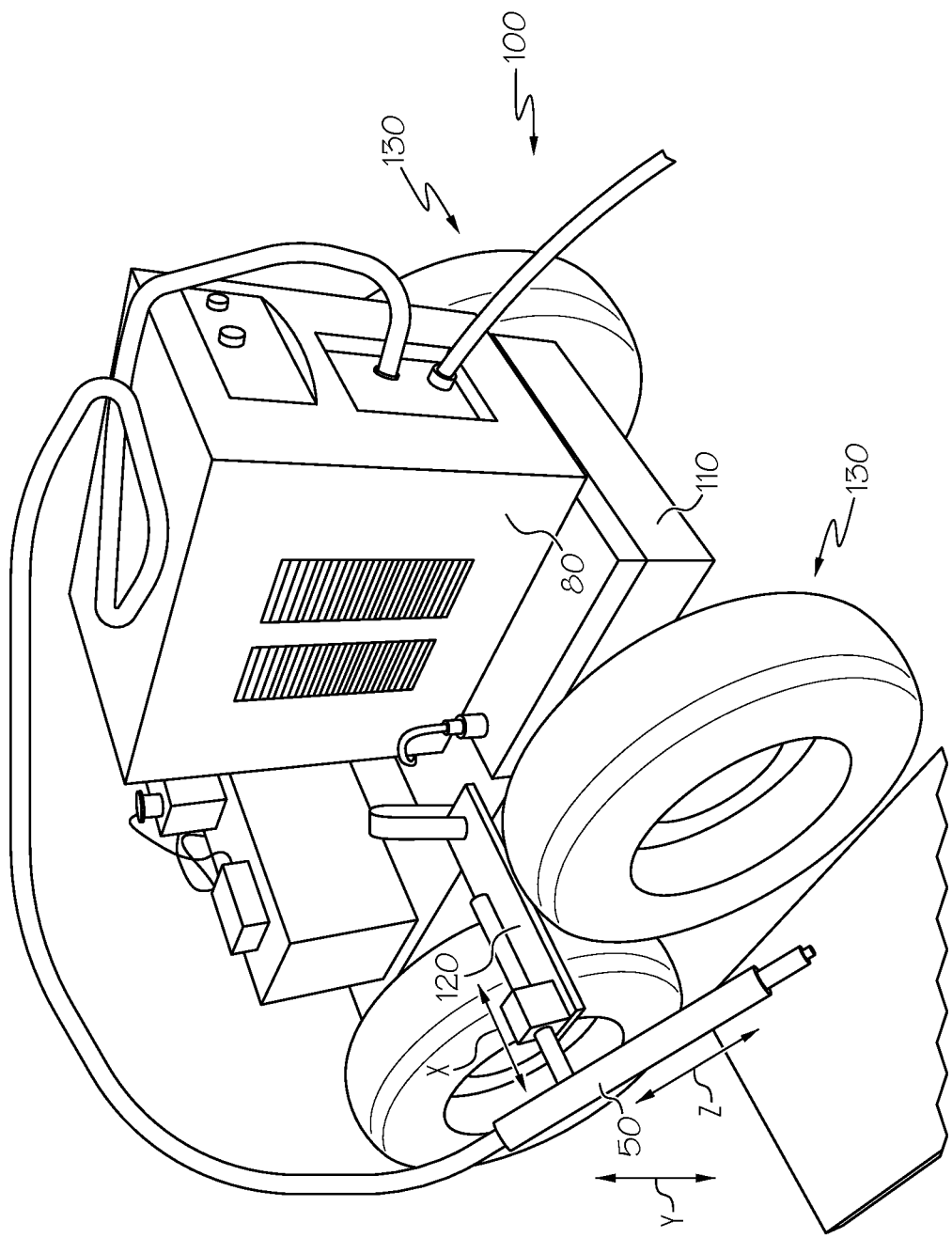
FIG. 2 is a perspective view of an example autonomous motion device configured to support and carry a plasma arc processing system.

For example, in some embodiments, referring to FIGS. 1-3, a motion device (e.g., an autonomous motion device) 100 is configured to operably connect to a plasma torch 50 operably connected to a plasma arc processing system 75. The motion device 100 can include a body 110 to support a power supply 80 of the plasma cutting system 75 configured to generate a plasma arc. The body 110 is typically configured to move along or otherwise relative to a workpiece 25.

The motion device 100 can include a torch holder 120 connected to the body 110 and configured to position a plasma arc torch tip 55 of the plasma torch 50 relative to a region of the workpiece 25 to be processed. As depicted, in some embodiments, the torch holder 120 is indirectly coupled to the body 110 and can be configured to move relative to the body 110. Additionally, in some embodiments, the torch holder 120 can be affixed on or otherwise be a component of the body 110.

In some embodiments, the torch holder 120 is configured to articulate the torch 50 and torch tip 55 in order to carry out one or more of various plasma processing operations. For example, the torch holder 120 can be configured to manipulate the plasma arc torch tip 55 along, or rotate relative to, at least one of an x, y, or z axes relative to the body 110. In some cases, the manipulation of the plasma arc torch tip 55 includes at least one of positioning or actuating the torch tip 55 relative to a workpiece 25 to be processed. While the examples depicted in FIG. 1 illustrate the torch holder 120 being separate from the power supply 80, other examples are possible. For example, briefly referring specifically to FIG. 2, in some embodiments, the torch holder 120 is coupled to the body 110 and moves directly with the power supply 80.

Referring generally back to FIGS. 1-3, the motion device 100 can also include a drive system 130 to translate the body 110 supporting the power supply 80 and torch 50 autonomously relative to a surface of the workpiece 25 during a plasma processing operation. In some embodiments, such as those in which the torch holder 120 is indirectly connected to the body 110, the drive system 130 can also be configured to move the torch holder 120 relative to the workpiece 25. For example, the torch holder 120 can be configured to articulate a plasma torch (or multiple torches) in the X, Y, and Z directions.

The drive system 130 can include any of various robotic systems configured to translate (e.g., convey, move, propel, drive) the body and the plasma processing system, such as robotic systems having one or more powered wheels and/or tracks that can be operated to translate the motion device. In some cases, the drive system 130 can include multiple wheels or tracks that can be operated in unison or independently from one another. The drive system can include means, or otherwise be configured, for locomotion in a constant or indexed fashion in any direction or position (e.g., horizontal or vertical motion with respect to a ground plane). For example, the drive system 130 can include an omnidirectional robotic drive system. In some cases, the drive system 130 can be configured to control oscillation, torch height control, pendulum motion, etc.

In some embodiments, the drive system 130 can include integrated directional guidance or one or more guiding tracks to attach to the workpiece, such as using magnetic forces, vacuum, adhesives, mechanical fasteners, etc. The drive system 130 can include means, or otherwise be configured, to accelerate/decelerate, and to travel at speeds consistent in accordance with a desired plasma processing process to be performed.

A processor 112 can be disposed in and/or on the motion device 100 and be in communication with the drive system 130. The processor 112 can also be configured to communicate with the power supply 80 so that the motion device 100 and plasma arc processing system 75 can be controlled in combination with one another. For example, the processor 112 can be configured to control the translation of the body 110 relative to the workpiece 25 in accordance with the plasma processing operation. In some embodiments, the processor 112 can also be configured to communicate with the torch holder 120. In some embodiments, the processor 112 can be configured to control and operate body 110, torch holder 120, and plasma arc processing system 75 collaboratively (e.g., simultaneously, in unison, etc.) to perform a plasma processing operation. In some embodiments, the processor 112 is configured to be separated and reconnected to the power supply 80 for operation of the plasma arc processing system 75 and the autonomous motion device 100.

In some embodiments, the motion device 100 includes a means to monitor a travel path of the motion device 100 during the plasma processing operation. For example, in some cases, the motion device 100 can also include a set of sensors configured to monitor at least one characteristic of the plasma processing operation and/or the translation of the body 110 relative to the workpiece 25. Sensors can include proximity sensors (e.g., using light, capacitance, inductance), triangulation sensors, light reflection sensors using light from plasma process or material emissivity, voltage potential sensors, sound sensors, vibration sensors, temperature sensors, and sensors observing speed, acceleration, tilt/position of the torch. For example, the sensors can include a light or thermal sensor configured to monitor cut quality of a plasma processing operation being performed. The light or thermal sensor observing the plasma process can provide data (e.g., data relating to light intensity, flash frequency, arc brightness, etc.) to the system 75 to analyze system performance. In some cases, a processor (e.g., the processor 112) is configured to communicate feedback from the sensors to the plasma cutting system 75. For example, a feedback loop can be created in which the sensors can provide information on a cut being performed and the system 75 and motion device 100 can adjust (e.g., alter, modify, update, or otherwise change) an operation in order to modify the cut being performed. Thus, the means to monitor a travel path of the motion device can include a means to provide travel path information to the processor to carry out a feedback loop to control the translation of the body relative to the workpiece in accordance with the plasma processing operation. The means to provide travel path information can include start/stop instructions, torch positioning instructions, or other process parameters, such as plasma current, torch gas flow, or ramp up or ramp down.

That is, in some examples, plasma arc processing system 75 and motion device 100 can be programmed to perform a cut or gouge along a predetermined or planned path with certain parameters (e.g., cut speed, current, gas pressure) and, based on feedback from the sensors, the programmed cut parameters can be updated as the cut is being performed.

In some cases, the sensors can be used to obtain information (e.g., data) to determine a desired travel path for the motion device for a processing operation. For example, the sensors can include an optical sensor that visually inspects a workpiece to be processed and determines where the motion device 100 should travel to perform an operation. In some embodiments, the sensors can include a physical sensor (e.g., a probe) to tactilely determine or predict a cutting path and therefore also a travel path of the motion device. For example, a probe can be used to feel a region of a workpiece to determine where the workpiece is to be cut or gouged and upon receiving information from the sensors, the processor 112 can re-program the motion device 100 and/or the plasma arc processing system 75 accordingly. Thus, in some cases, the means to monitor a travel path can include a probe to physically detect a planned plasma processing path.

In some embodiments, the motion device 100 can include one or more devices configured to collect operational data for transmission to mobile devices. For example, the motion device 100 can include one or more Internet-of-things (IOT) devices. In some cases, IOT devices can include wired or wireless devices capable of collecting, storing, or transmitting data, such as cell phones, tablets, PCs, or other devices containing hardware, firmware, or software. Other examples can include controls features and user interface devices.

In some embodiments, the autonomous motion device 100 includes a gas supply, which can be configured to travel with the body. In some cases, the gas supply can include an autonomous pressurized gas source fluidly connected to the power supply 80 and the plasma arc torch 50. For example, in some cases, the gas supply can include a gas tank or compressor disposed on the body 110. Including the gas supply on the motion device 100 (e.g., on the body 110), in a portable form, can help make the motion more portable and adaptable for various processing operations without being tethered, for example, to a shop gas supply.

Briefly referring to FIG. 3, the autonomous motion device 100 can include a control device (e.g., controller) 150 in communication with the processor 112. The control device 150 can be used to direct or remote control the operation of the plasma arc processing system 75 and/or the motion device 100. In some embodiments, the control device 150 can be in the form of a dedicated handheld controller. Alternatively or additionally, the control device 150 can be in the form of a cellular telephone, tablet, or other computing device. The control device 150 can be in wired or wireless communication with the power supply 80 and/or the motion device 100. Thus, in some cases, various components (e.g., the power supply 80, motion device 100, body 110, torch holder 120, and control device 150) can include wireless transmitters/receivers 125 to send and receive information. In some embodiments, the control device 150 can receive information (e.g., information relating to a processing operation being performed) from the motion device 100 and provide information to the power supply 80 and the motion device 100. Thus, a feedback communication and control loop can be formed. As discussed above, while the examples depicted in FIG. 3 illustrate the power supply 80 being disposed separately from the torch holder 120, the torch holder 120 and motion device 100 can be disposed together as a common robotic component on the body 110.

The communication system between the motion device 100, control device 150 and plasma processing system 75 can be configured to control various system functions. For example, the control device 150 can be used for system level process controls and status indicators, power up and/or down, safety functions, and IOT connectivity or system interfacing.

The systems described herein can be used to carry out any of various plasma arc processing operations. For example, in some embodiments, methods of operating a plasma arc processing system with an autonomous motion device configured to move the plasma arc processing system relative to a workpiece can first include initiating a plasma arc from a torch tip of a plasma torch of the plasma arc processing system operably connected to the motion device, the plasma arc beginning a plasma processing operation on the workpiece. For example, the plasma arc processing system 75 can initiate a plasma arc in a torch tip 55 to begin a plasma processing operation on the workpiece 25.

The methods can include autonomously moving the motion device, where the motion device supports the plasma arc processing system, relative to the workpiece to perform the plasma processing operation along an intended processing path of the workpiece. For example, the drive system 130 can move the body 110 and the plasma arc processing system disposed thereon relative to the workpiece 25.

In some embodiments, the methods can include monitoring the plasma processing operation being performed using one or more sensors disposed in or on the autonomous motion device. As discussed above, visual or thermal sensors can be used to monitor the plasma processing operation and the system can determine if any of various modifications of changes in system parameters are desired. For example, the sensors can track and monitor ongoing cut quality and adapt the cutting process accordingly. In some cases, the methods can include manipulating the torch tip relative to the workpiece during the movement relative to the workpiece.

Additionally or alternatively, in some embodiments, the methods can include determining a planned travel path along the workpiece to perform the plasma processing operation. For example, the sensors can also include physical sensors, such as the probes discussed above, that can feel the regions to be processed as the plasma arc processing system and motion device moves along the workpiece. In some cases, a probe can feel a joint to be subsequently welded, in which positioning spot welds are to be removed by gouging prior to welding, and the travel path of the motion device can be updated to following the joint. Once the desired plasma arc processing operation is performed, the methods can include extinguishing the plasma arc.

While various embodiments have been described herein, it should be understood that they have been presented and described by way of example only, and do not limit the claims presented herewith to any particular configurations or structural components. Thus, the breadth and scope of a preferred embodiment should not be limited by any of the above-described exemplary structures or embodiments, but should be defined only in accordance with the following claims and their equivalents.

What is claimed:

1. An autonomous motion device configured to operably connect to a plasma arc torch of a plasma arc processing system, the autonomous motion device comprising:
    a body connected to a torch holder and movable relative to a workpiece, the torch holder configured to position a plasma arc torch tip of the plasma arc torch relative to a region of the workpiece to be processed;
    a drive system to translate the body, which translates the torch holder, autonomously relative to a surface of the workpiece during a plasma processing operation;
    a set of one or more sensors configured to monitor at least one characteristic of the plasma processing operation or the translation of the body relative to the workpiece; and
    a processor in communication the set of sensors, the processor being configured to receive feedback from the set of sensors to control the translation of the body relative to the workpiece and to communicate with the plasma arc processing system to update one or more cutting parameters during the plasma processing operation, the one or more cutting parameters not including torch positioning instructions.

2. The autonomous motion device of claim 1 wherein the set of sensors include a light sensor configured to monitor cut quality.

3. The autonomous motion device of claim 1 wherein the set of sensors obtain information to determine a travel path of the autonomous motion device.

4. The autonomous motion device of claim 1 further comprising one or more Internet-of-things (IOT) devices configured to collect operational data for transmission to mobile devices.

5. The autonomous motion device of claim 1 wherein the torch holder is configured to manipulate the plasma arc torch tip along at least one of an x, y, or z axes relative to the body.

6. The autonomous motion device of claim 5 wherein the manipulation of the plasma arc torch tip includes positioning the torch tip.

7. The autonomous motion device of claim 1 further comprising a gas supply configured to travel with the body.

8. The autonomous motion device of claim 1 further comprising a control device in communication with the processor.

9. The autonomous motion device of claim 1 wherein the motion device comprises a means to monitor a travel path of the motion device during the plasma processing operation, the means comprising the set of one or more sensors configured to monitor at least one characteristic of the plasma processing operation or the translation of the body relative to the workpiece.

10. The autonomous motion device of claim 9 wherein the means to monitor a travel path of the motion device further comprises a means to provide travel path information to the processor to carry out a feedback loop to control the translation of the body relative to the workpiece in accordance with the plasma processing operation.

11. The autonomous motion device of claim 1 wherein the drive system comprises an omnidirectional robotic drive system.

12. The autonomous motion device of claim 9 wherein the set of one or more sensors comprises a probe to physically detect a planned plasma processing path.

13. The autonomous motion device of claim 1, further comprising a power supply supported by the body to move relative to the workpiece.

14. The autonomous motion device of claim 13, wherein the torch holder is indirectly connected to the body via the power supply.

15. The autonomous motion device of claim 1, wherein the torch holder is affixed to the body.

16. The autonomous motion device of claim 1, wherein the cutting parameters include at least one of cut speed, plasma current or gas pressure.

17. A method of operating a plasma arc processing system with an autonomous motion device, the method comprising:
    initiating a plasma arc from a torch tip of a plasma arc torch of the plasma arc processing system, the plasma arc torch operably connected to the motion device, the plasma arc beginning a plasma processing operation on the workpiece;
    autonomously moving the motion device, the motion device supporting the plasma arc torch, relative to the workpiece to perform the plasma processing operation along an intended processing path of the workpiece;
    monitoring the plasma processing operation using one or more sensors disposed on the motion device;
    updating one or more cutting parameters during the plasma processing operation based on feedback from the one or more sensors, the one or more cutting parameters not including torch positioning instructions; and
    extinguishing the plasma arc.

18. The method of claim 17 further comprising manipulating the torch tip relative to the workpiece during the movement relative to the workpiece.

19. The method of claim 17 further comprising determining a planned travel path along the workpiece to perform the plasma processing operation.

20. The method of claim 17, wherein the cutting parameters include at least one of cut speed, plasma current or gas pressure.

21. An autonomous plasma arc processing system comprising:

a plasma torch power supply configured to generate a plasma arc;

a plasma arc torch operably connected to the power supply;

an autonomous pressurized gas source fluidly connected to the plasma arc torch; and an autonomous motion device operably connected to the plasma arc torch and supporting the plasma arc torch, the motion device comprising:

a body connect to a torch holder and movable relative to a workpiece, the torch holder configured to position a plasma arc torch tip of the plasma arc torch relative to a region of the workpiece to be processed;

a drive system to translate the body, which translates the torch holder, autonomously relative to a surface of the workpiece during a plasma processing operation;

a set of one or more sensors configured to monitor at least one characteristic of the plasma processing operation or the translation of the body relative to the workpiece; and a processor in communication with the drive system and configured to communicate with the set of sensors, the processor being configured to receive feedback from the set of sensors to control the translation of the body relative to the workpiece and to update one or more cutting parameters during the plasma processing operation, the one or more cutting parameters not including torch positioning instructions.

22. The method of claim 21, wherein the cutting parameters include at least one of cut speed, plasma current or gas pressure.

* * * * *